(12) United States Patent
Yamagiwa et al.

(10) Patent No.: US 11,085,124 B2
(45) Date of Patent: Aug. 10, 2021

(54) ELECTROCHEMICAL REACTION DEVICE

(71) Applicant: KABUSHIKI KAISHA TOSHIBA, Minato-ku (JP)

(72) Inventors: Masakazu Yamagiwa, Yokohama (JP); Ryota Kitagawa, Setagaya (JP); Yuki Kudo, Yokohama (JP); Akihiko Ono, Kita (JP); Satoshi Mikoshiba, Yamato (JP); Jun Tamura, Chuo (JP); Yoshitsune Sugano, Kawasaki (JP); Asahi Motoshige, Ota (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 168 days.

(21) Appl. No.: 16/560,617

(22) Filed: Sep. 4, 2019

(65) Prior Publication Data

US 2020/0017985 A1    Jan. 16, 2020

Related U.S. Application Data

(63) Continuation of application No. PCT/JP2018/032240, filed on Aug. 30, 2018.

(30) Foreign Application Priority Data

Mar. 20, 2018    (JP) .............................. JP2018-052940

(51) Int. Cl.
  *C25B 15/08*    (2006.01)
  *B01D 53/22*    (2006.01)
  (Continued)

(52) U.S. Cl.
  CPC ............ *C25B 15/08* (2013.01); *B01D 53/228* (2013.01); *C25B 1/04* (2013.01); *C25B 3/25* (2021.01);
  (Continued)

(58) Field of Classification Search
  CPC .......... B01D 2202/20; B01D 2257/504; B01D 53/228
  See application file for complete search history.

(56) References Cited

U.S. PATENT DOCUMENTS

2009/0233155 A1*   9/2009   Littau .................... B01D 53/62
                                                                          429/483
2009/0246572 A1   10/2009   Dahlberg et al.
                   (Continued)

FOREIGN PATENT DOCUMENTS

JP          2009-540130 A     11/2009
JP          2012-25601 A       2/2012
                   (Continued)

OTHER PUBLICATIONS

International Search Report dated Oct. 16, 2018 in PCT/JP2018/032240 filed Aug. 30, 2018 (with English Translation of Categories of Cited Documents).
(Continued)

*Primary Examiner* — Harry D Wilkins, III
(74) *Attorney, Agent, or Firm* — Oblon, McClelland, Maier & Neustadt, L.L.P.

(57) ABSTRACT

An electrochemical reaction device comprises: an anode unit to oxidize water and thus generate oxygen; a cathode unit to reduce carbon dioxide and thus generate a carbon compound and hydrogen; a separator separating the anode and cathode units; and a power supply connected to the anode and cathode units, the cathode unit including: a porous member having a first surface and a second surface; a flow path plate facing the first surface; and a reduction catalyst on the second surface, and the flow path plate including: a flow path through which a target gas containing the carbon dioxide flows; and a porous film separating a first space and a second space inside the flow path and being permeated
(Continued)

with an ionic liquid, the ionic liquid being configured to separate the carbon dioxide from the target gas.

11 Claims, 8 Drawing Sheets

(51) Int. Cl.
 *C25B 3/25* (2021.01)
 *C25B 9/23* (2021.01)
 *C25B 1/04* (2021.01)
(52) U.S. Cl.
 CPC ............ *C25B 9/23* (2021.01); *B01D 2202/20* (2013.01); *B01D 2257/504* (2013.01)

(56) References Cited

U.S. PATENT DOCUMENTS

| | | | |
|---|---|---|---|
| 2013/0122382 A1 | 5/2013 | Mizuhata et al. | |
| 2013/0186771 A1 | 7/2013 | Zhai et al. | |
| 2014/0291163 A1 | 10/2014 | Kanan et al. | |
| 2015/0047989 A1 | 2/2015 | Huang | |
| 2015/0252483 A1* | 9/2015 | Ono | B01J 19/127 |
| | | | 204/252 |
| 2016/0017503 A1 | 1/2016 | Kaczur et al. | |
| 2016/0145752 A1 | 5/2016 | Salehi et al. | |
| 2016/0289143 A1* | 10/2016 | Duggal | C07C 2/42 |
| 2017/0037522 A1* | 2/2017 | Kaczur | C25B 15/02 |
| 2017/0268118 A1 | 9/2017 | Ono et al. | |
| 2018/0023198 A1* | 1/2018 | Graetzel | C25B 1/55 |
| | | | 205/391 |
| 2018/0030604 A1 | 2/2018 | Manabe et al. | |
| 2018/0127885 A1* | 5/2018 | Krause | C25B 3/25 |
| 2018/0274114 A1* | 9/2018 | Ono | C25B 11/031 |
| 2019/0127865 A1* | 5/2019 | Li | C25B 1/00 |

FOREIGN PATENT DOCUMENTS

| | | |
|---|---|---|
| JP | 5017499 B2 | 9/2012 |
| JP | 2013-253269 A | 12/2013 |
| JP | 2013-544957 A | 12/2013 |
| JP | 2017-172037 A | 9/2017 |
| JP | 2018-021217 A | 2/2018 |
| JP | WO2018/043053 A1 | 3/2018 |

OTHER PUBLICATIONS

Written Opinion dated Oct. 16, 2018 in PCT/JP2018/032240 filed Aug. 30, 2018.

* cited by examiner

ELECTROCHEMICAL REACTION DEVICE

CROSS-REFERENCE TO RELATED APPLICATIONS

This application is a continuation of prior International Application No. PCT/JP2018/032240 filed on Aug. 30, 2018; the entire contents of all of which are incorporated herein by reference.

FIELD

Embodiments described herein relate generally to an electrochemical reaction device.

BACKGROUND

In recent years, from both viewpoints of energy problem and environmental problem, it is strongly desired not only to convert renewable energy such as sunlight into electric energy and use it but also to convert the renewable energy into a storable and conveyable state. To cope with such demands, an artificial photosynthesis technology is under development which uses sunlight to generate a chemical substance as in photosynthesis by plants. This technology makes possible the storing of renewable energy in the form of fuel, and the generation of a chemical substance for use as an industrial raw material, and is expected to create value.

As a device to generate a chemical substance by using renewable energy such as sunlight, there is known, for example, an electrochemical reaction device which has a cathode, reducing carbon dioxide ($CO_2$) from a power station or a incineration plant, and an anode, oxidizing water ($H_2O$). The cathode reduces carbon dioxide to generate a carbon compound such as carbon monoxide (CO), for example. To materialize such an electrochemical reaction device in a cell format (also referred to as an electrolysis cell), utilizing a structure similar to a fuel cell, such as a polymer electric fuel cell (PEFC) for example, is considered to be effective. However, in this case, problems related to the PEFC also carry over.

BRIEF DESCRIPTION OF THE DRAWINGS

FIG. 3 is a diagram illustrating a part of an X-Y cross section of a flow path layer 22a;

DETAILED DESCRIPTION

Figure 1:
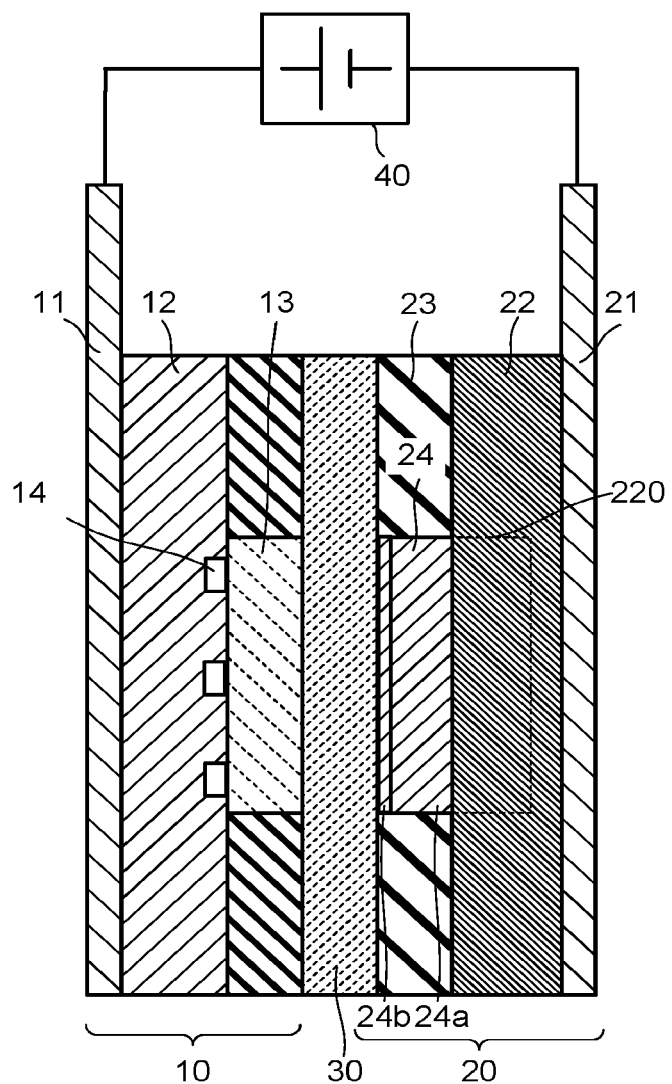
FIG. 1 is a cross-sectional schematic diagram illustrating a structure example of an electrochemical reaction device.

An electrochemical reaction device of the embodiment comprises: an anode unit to oxidize water and thus generate oxygen; a cathode unit to reduce carbon dioxide and thus generate a carbon compound and hydrogen; a separator separating the anode and cathode units; and a power supply connected to the anode and cathode units, the cathode unit including: a porous member having a first surface and a second surface; a flow path plate facing the first surface; and a reduction catalyst on the second surface, and the flow path plate including: a flow path through which a target gas containing the carbon dioxide flows; and a porous film separating a first space and a second space inside the flow path and being permeated with an ionic liquid, the ionic liquid being configured to separate the carbon dioxide from the target gas.

Hereinafter, embodiments will be described with reference to the drawings. Note that the drawings are schematic and that sizes such as a thickness and a width of each component, for example, might be different from actual sizes of the component. Further, in the embodiment, the same reference numeral is granted to substantially the same component and explanation is sometimes omitted.

FIG. 1 is a cross-sectional schematic diagram illustrating a structure example of an electrochemical reaction device of the embodiment. The electrochemical reaction device has an anode unit 10, a cathode unit 20, a separator 30 and a power supply 40.

The anode unit 10 can oxidize water ($H_2O$) to generate oxygen and hydrogen ions or oxidize hydroxide ions ($OH^-$) to generate water and oxygen. The anode unit 10 has a current collector 11, a flow path plate 12, a porous member 13, and a flow path 14.

The current collector 11 is electrically connected to the power supply 40. The current collector 11 preferably contains a material which has low chemical reactivity and high electric conductivity. Examples of such a material include metal materials such as Ti and SUS, and carbon.

The flow path plate 12 is electrically connected to the current collector 11. The flow path plate 12 has a groove facing the porous member 13. The flow path plate 12 has a function as a flow path plate. As the flow path plate 12, a material which has low chemical reactivity and high electric conductivity is preferably used. Examples of such a material include metal materials such as Ti and SUS, and carbon.

The porous member 13 constitutes at least a part of the anode. The porous member 13 has a function as a gas diffusion layer. The porous member 13 has a base material having a porous structure such as a mesh material, a punching material, a madreporic body, or a metal fiber sintered body, for example. The base material may be constituted by a metal such as metal titanium (Ti), nickel (Ni), or iron (Fe), or a metal material such as an alloy (for example, SUS) containing at least one of these metals.

The porous member 13 has an oxidation catalyst held by a surface. Examples of the oxidation catalyst include metals such as platinum (Pt), palladium (Pd) and nickel (Ni), alloys and intermetallic compounds containing those metals, binary metal oxides such as manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O), lithium oxide (Li—O) and lanthanum oxide (La—O), ternary metal oxides such as Ni—Co—O, Ni—Fe—O, La—Co—O, Ni—La—O and Sr—Fe—O, quaternary metal oxides such as Pb—Ru—Ir—O and La—Sr—Co—O, and metal complexes such as Ru complex and Fe complex.

The oxidation catalyst preferably attaches to or is stacked on a surface of the porous member 13 to form a catalyst layer. The oxidation catalyst preferably has a nanoparticle, a nanostructure, a nanowire or the like in order to enhance oxidation reaction. The nanostructure is a structure in which nanoscale projections and depressions are formed on a surface of a catalyst material.

The flow path plate 12 has the flow path 14. The flow path 14 includes a space surrounded by the groove of the flow path plate 12 and the porous member 13. The flow path 14 has a function as an electrolytic solution flow path for letting flow an electrolytic solution containing a substance to be oxidized such as water, for example.

The electrolytic solution is preferable to be a solution containing at least water. The electrolytic solution may or may not contain carbon dioxide. In the case of providing a flow path to supply the electrolytic solution to the cathode unit 20, the same solution may be adopted as the electrolytic solution on the anode unit 10 side and as the electrolytic solution on the cathode unit 20 side, or different solutions may be adopted. Examples of the water-containing solution which is used as the electrolytic solution include an aqueous solution containing an arbitrary electrolyte. Examples of the aqueous solution containing the electrolyte include an aqueous solution which contains at least one ion selected from hydroxide ion ($OH^-$), hydrogen ion potassium ion ($H^+$), sodium ion ($Na^+$), lithium ion ($Li^+$), chloride ion ($Cl^-$), bromide ion ($Br^-$), iodide ion ($I^-$), nitrate ion ($NO_3^-$), sulfate ion ($SO_4^{2-}$), phosphoric acid ion ($PO_4^{2-}$), boric acid ion ($BO_3^{3-}$), and hydrogen carbonate ion ($HCO_3^-$). In order to decrease electric resistance of the solution, an alkaline solution in which an electrolyte such as potassium hydroxide or sodium hydroxide is dissolved at a high concentration is preferably used as the electrolytic solution.

As the electrolytic solution, it is possible to use an ionic liquid which is composed of salt of a cation such as imidazolium ions or pyridinium ions and an anion such as $BF_4^-$ or $PF_6^-$ and which is in a liquid form in a wide temperature range, or its aqueous solution. Other examples of the electrolytic solution include amine solutions such as ethanolamine, imidazole, and pyridine, and aqueous solutions thereof. The amine may be any of primary amine, secondary amine, and tertiary amine.

The cathode unit 20 can reduce carbon dioxide to generate a carbon compound and hydrogen. The cathode unit 20 has a current collector 21, a flow path plate 22, a support 23, and a porous member 24.

The current collector 21 is electrically connected to the power supply 40. The current collector 21 preferably contains a material which has low chemical reactivity and high electric conductivity. Examples of such a material include metal materials such as Ti and SUS, and carbon.

The flow path plate 22 is connected to the current collector 21. The flow path plate 22 has a flow path part 220. The flow path plate 22 has a function as a gas flow path letting flow a gas containing carbon dioxide, for example. The flow path plate 22 contains a conductive material which is high in corrosion resistance against water, for example. The flow path plate 22 contains a metal material such as Ti or SUS, or carbon, for example.

The flow path plate 22 is preferably a metal plate containing a material which has low chemical reactivity and high electric conductivity. Examples of such a material include metal plates of Ti, SUS and so on. Because of the necessity to sandwich the cell structure with a sufficient pressure in order to maintain airtightness of liquid and gas in the electrochemical reaction device, a thickness of the metal plate is desired to be a thickness which does not allow bending by a pressure at the time of sandwiching, in correspondence with the material.

The support 23 has a function to support the porous member 24. The support 23 has an opening, for example, and the porous member 24 is disposed in that opening. Note that the opening of the support 23 may be connected to the outside of the support 23.

The porous member 24 constitutes at least a part of the cathode. The porous member 24 has a laminated body of a porous layer 24a having a function as a gas diffusion layer and a reduction catalyst layer 24b containing a reduction catalyst. The porous layer 24a has a first surface facing the flow path plate 22, a second surface holding the reduction catalyst layer 24b, and a fine pore communicating from the first surface to the second surface. The porous layer 24a is constituted by carbon paper, carbon cloth, or the like, for example.

The reduction catalyst is provided to reduce carbon dioxide to generate at least one of a carbon compound and hydrogen, for example. The reduction catalyst is preferably constituted by a catalyst material capable of decreasing overvoltage. Examples of such a material include metals such as gold (Au), silver (Ag), copper (Cu), platinum (Pt), palladium (Pd), nickel (Ni), cobalt (Co), iron (Fe), manganese (Mn), titanium (Ti), cadmium (Cd), zinc (Zn), indium (In), gallium (Ga), lead (Pb) and tin (Sn), metal materials such as an alloy or an intermetallic compound containing at least one of those metals, carbon materials such as carbon (C), graphene, CNT (carbon nanotube), fullerene and ketjen black, and metal complexes such as an Ru complex and an Re complex. The reduction catalyst layer 24b may have various shapes such as a plate shape, a mesh shape, a wire shape, a grain shape, a porous shape, a thin-film shape and island shape, for example.

The separator 30 is constituted by an ion exchange membrane or the like which can transfer ions between the anode unit 10 and the cathode unit 20 and can separate the anode unit 10 and the cathode unit 20. As the ion exchange membrane, for example, a cation exchange membrane such as Nafion or Flemion, or an anion exchange membrane such as Neosepta or Selemion can be used. As will be described later, when an alkaline solution is used as the electrolytic solution and transfer of hydroxide ions ($OH^-$) is mainly supposed, the separator 30 is preferable to be constituted by the anion exchange membrane. However, other than the ion exchange membrane, as long as the material is one capable of transferring ions between the anode unit 10 and the cathode unit 20, a glass filter, a porous polymer membrane, a porous insulating material or the like can be adopted as the separator 30.

The power supply 40 is electrically connected to the anode unit 10 and the cathode unit 20. The power supply 40 and the anode unit 10 as well as the power supply 40 and the cathode unit 20 may be connected by wirings, for example. The power supply 40 includes a power supply device such as a photoelectric conversion element, a system power supply or a storage power supply, or a conversion part converting renewable energy such as wind power, water power, geothermal power or tidal power into electric energy. For example, the photoelectric conversion element has a function to perform charge separation by energy of light such as irradiated sunlight. Examples of the photoelectric conversion element include a pin junction solar cell, a pn junction solar cell, an amorphous silicon solar cell, a multijunction solar cell, a single crystal silicon solar cell, a polycrystalline silicon solar cell, a dye sensitized solar cell and an organic thin-film solar cell.

When an exhaust gas which contains carbon dioxide, for example, is introduced via the flow path plate 22, an impurity gas contained in the exhaust gas sometimes generates unnecessary side reactions. Further, when a reduction product and unreduced carbon dioxide are collected, it is preferable to separate the two from each other. The larger the proportion of the impurity in the exhaust gas is, the larger the volume capacity of the tank of an impurity removing unit is, which makes the cost of the entire system higher. Further, when the reduction product is retrieved from the same flow path as that of carbon dioxide, it is necessary to concentrate CO and carbon dioxide outside the unit, which results in a complicated system.

As a method for separating carbon dioxide from an exhaust gas, for example, there can be cited a method in which carbon dioxide is separated and retrieved from the exhaust gas by using a separation membrane, and then the carbon dioxide is reduced. However, the conventional separation/reduction method using the separation membrane requires a high temperature, and generation of syngas by use of a solid oxide electrolyzer in combination is supposed, so that separation method is difficult to implement.

Further, in a fuel cell, a flow path extends in a serpentine shape, for example. By use of such a shape, while maintaining a contact area which enables sufficient electrical inter-engagement between the flow path plate and a gas diffusion film having a role of support, conduction, and gas introduction of a catalyst, it is possible to secure the longest possible gas introduction route. However, pressure gradient of an introduced gas sometimes occurs between a gas inlet and an outlet of the flow path.

In contrast, the electrochemical reaction device of the embodiment controls a flow path structure in the flow path plate 22, thereby facilitating separation of carbon dioxide and enabling control of pressure gradient of an introduced gas.

Figure 2:
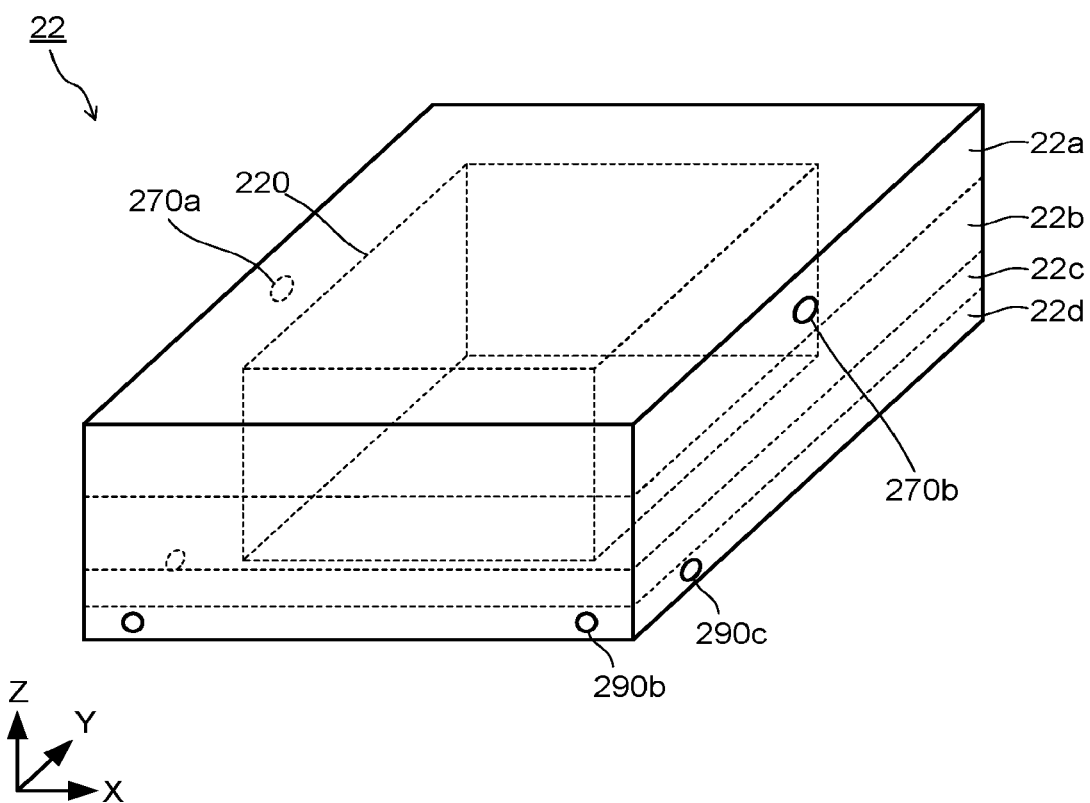
FIG. 2 is an external appearance schematic diagram illustrating a structure example of a flow path plate 22.

Next, a concrete structure example of the flow path plate 22 will be described. FIG. 2 is an external appearance schematic diagram illustrating the structure example of the flow path plate 22. The flow path plate 22 illustrated in FIG. 2 has a laminated body having a flow path layer 22a, a flow path layer 22b, a flow path layer 22c, and a flow path layer 22d. The flow path layer 22a is faced to the current collector 21, for example, and the flow path layer 22d is faced to the porous member 24. The flow path layer 22a to the flow path layer 22d constitute the flow path part 220. The flow path layer 22a to the flow path layer 22d extend along an X-axis direction and a Y-axis direction perpendicular to the X-axis direction and are laminated along a Z-axis direction, for example. Note that at least two of the flow path layers from the flow path layer 22a to the flow path layer 22d may be formed integrally or independently.

Figure 3:
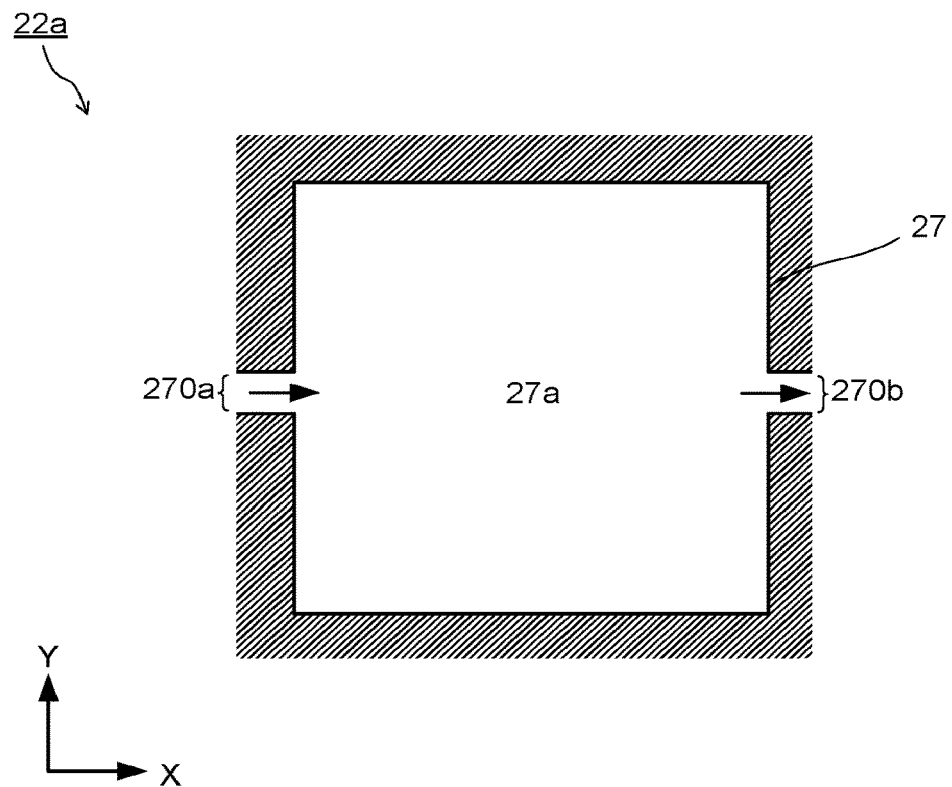

FIG. 3 is a diagram illustrating a part of an X-Y cross section of the flow path layer 22a. The flow path layer 22a has an inlet 270a for introducing a gas such as an exhaust gas containing carbon dioxide from a carbon dioxide supply part, an outlet 270b for discharging the above-described gas, and a groove constituting a space 27a inside a flow path 27. The inlet 270a and the outlet 270b communicate with the space 27a inside the flow path 27.

Figure 4:
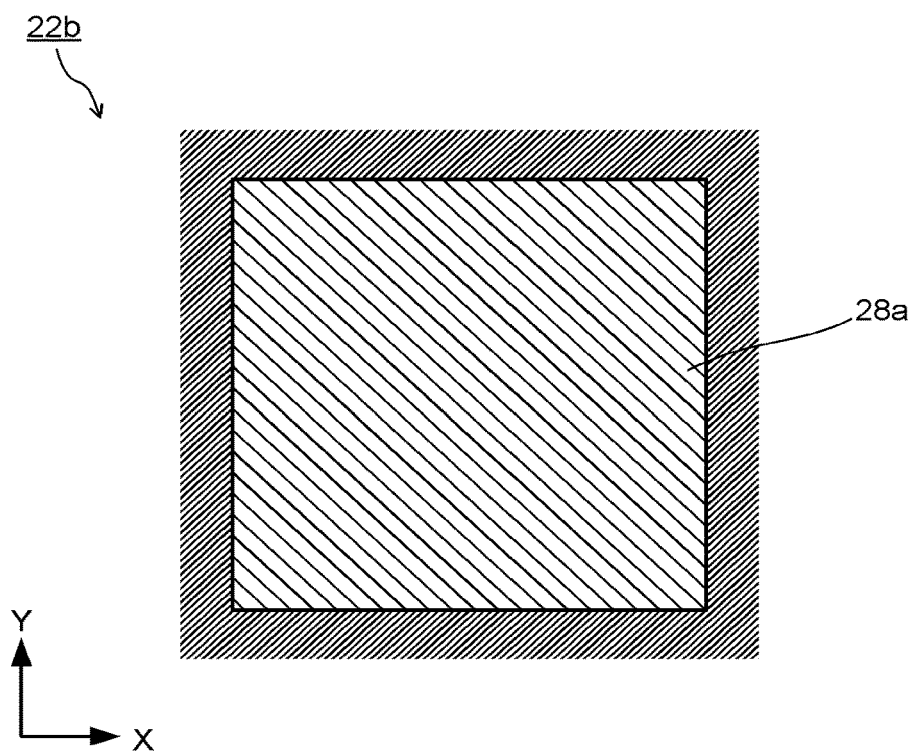
FIG. 4 is a diagram illustrating a part of an X-Y cross section of a flow path layer 22b.

FIG. 4 is a diagram illustrating a part of an X-Y cross section of the flow path layer 22b. The flow path layer 22b has a porous film 28a provided in an opening. Note that the porous film 28a is not necessarily required to be provided.

The porous film 28a is a porous film in which an ionic liquid permeates fine pores (also referred to as SILM; Supported Ionic Liquid Membrane). In the SILM, an ionic liquid having high viscosity is supported by the porous film. This ionic liquid is difficult to evaporate and can separate carbon dioxide from a target gas such as an exhaust gas containing carbon dioxide. Such separation is performed also at a room temperature. Use of the SILM can materialize a function as a purification film purifying carbon dioxide supplied to the porous member 24, for example. Therefore, it is possible to increase purity of carbon dioxide.

The porous film 28a preferably has a large specific surface area and a porosity of 0.01 or more and 0.99 or less, for example. The porosity can be measured by fine pore distribution measurement (mercury intrusion method or gas absorption method). An average pore size of the porous film 28a is preferably 1 nm or more and 1 mm or less, for example. The average pore size can be measured by an electron microscope. A thickness of the porous film 28a is preferably 100 nm or more and 10 mm or less, for example. An area of the porous film 28a is set in correspondence with a configuration of the electrochemical reaction device and is preferably 1 mm$^2$ or more and 10 m$^2$ or less, for example.

Solubility of carbon dioxide in the ionic liquid in the SILM is higher than solubility of other gaseous materials (for example, oxygen, nitrogen, hydrogen, helium, sulfur compound, reduction product (carbon compound), and so on). The reason for this is considered that an anion and/or a cation of the ionic liquid are/is likely to attract polar molecules such as carbon dioxide and that carbon dioxide is likely to be taken in the ionic liquid. Further, since the ionic liquid absorbs carbon dioxide by both mechanisms of chemical absorption and physical absorption, carbon dioxide migrates inside the ionic liquid by both diffusion of ions ($CO_3^{2-}$, $HCO_3^-$) and diffusion of a $CO_2$ gas. For these reasons, the SILM is likely to transmit carbon dioxide compared with other gases. Thus, air permeability of carbon dioxide in the ionic liquid in the SILM is higher than air permeability of other gaseous substances (for example, oxygen, nitrogen, hydrogen, helium, sulfur compound, reduction product (carbon compound), and so on). Air permeability to each gas is indicated by a product of solubility and diffusion coefficient of each gas.

Materials of the ionic liquid and the porous film constituting the porous film 28a are properly selected in correspondence with usage. Examples of combination of the ionic liquid and the porous film will be listed in Table 1 to Table 3. For example, when carbon dioxide is to be separated from a target gas being a mixed gas containing carbon dioxide and at least one gas selected from a group consisting of a carbon compound such as methane, oxygen, and nitrogen, it is preferable to use 1-hexyl-3-methylimidazolium bis(trifluoromethylsulfonyl)imide ([HMIM][NTf$_2$]) ionic liquid or 1-octyl-3-methylimidazolium bis(trifluoromethylsulfonyl)imide ([OMIM][NTf$_2$]) ionic liquid which is supported by a polyethersulfone (PES) porous film.

TABLE 1

| SILM | Ionic liquid | | Porous film | |
|---|---|---|---|---|
| 1 | [BMIM][NTf$_2$] | 1-butyl-3-methylimidazolium bis(trifluoromethylsulfonyl)imide | PA | Polyamide |
| 2 | [BMIM][NTf$_2$] | 1-butyl-3-methylimidazolium bis(trifluoromethylsulfonyl)imide | PP | Polypropylene |
| 3 | [BMIM][PF$_6$] | 1-butyl-3-methylimidazolium hexafluorophosphate | Al$_2$O$_3$ | Aluminum oxide |
| 4 | [BMIM][PF$_6$] | 1-butyl-3-methylimidazolium hexafluorophosphate | PVDF | Polyvinylidene fluoride |
| 5 | [BMIM][TfO] | 1-butyl-3-methylimidazolium trifluoromethanesulfonate | PES | Polyethersulfone |
| 6 | [BMIM][TfO] | 1-butyl-3-methylimidazolium triflouromethanesulfonate | PVDF | Polyvinylidene fluoride |
| 7 | [BMIM][TfO] | 1-butyl-3-methylimidazolium trifluoromethanesulfonate | PA | Polyamide |
| 8 | [BMIM][TfO] | 1-butyl-3-methylimidazolium trifluoromethanesulfonate | PP | Polypropylene |
| 9 | [HMIM][Tf$_2$N] | 1-hexyl-3-methylimidazolium bis(trifluoromethylsulfonyl)imide | PES | Polyethersulfone |
| 10 | [OMIM][PF$_6$] | 1-octyl-3-methylimidazolium hexafluorophosphate | PVDF | Polyvinylidene fluoride |
| 11 | [C$_{10}$MIM][BF$_4$] | 1-decyl-3-methylimidazolium tetrafluoroborate | PVDF | Polyvinylidene fluoride |
| 12 | h[MIM]$_2$[Tf$_2$N]$_2$ | 1,6-di(3-methylimidazolium)hexanedi(bis(trifluoromethylsulfonyl)imide | alumina NF membrane | Alumina nanofilter film |
| 13 | pr[MIM]$_2$[Tf$_2$N]$_2$ | 1,3-di(3-methylimidazolium)propanedi(bis(trifluoromethylsulfonyl)imide | alumina NF membrane | Alumina nanofilter film |
| 14 | styrene-based IL | Styrene-based ionic liquid | PES | Polyethersulfone |
| 15 | styrene-based IL | Styrene-based ionic liquid | PES | Polyethersulfone |
| 16 | styrene-based IL | Styrene-based ionic liquid | PES | Polyethersulfone |
| 17 | [C$_3$NH$_2$MIM][CF$_3$SO$_3$] | N-aminopropyl 1,3-methylimidazolium bis(trifluoromethane | PVDF | Polyvinylidene fluoride |
| 18 | [HMIM][NTf$_2$] | 1-hexyl-3-methylimidazolium bis(trifluoromethylsulfonyl)imide | PS | Polysulfone |
| 19 | [SMMIM][PF$_6$] | 1-methyl-3-(1-trimethoxysilyl methyl)imidazolium hexafluorophosphate | γ-alumina NF membrane | γ alumina nanofilter film |
| 20 | [EMIM][TFSI] | 1-ethyl-3-methylimidazolium bis(trifluoromethylsulfonyl) | p(VDF-HFP) | Poly(vinylidene fluoride-hexafluoro propylene) |
| 21 | [EMIM][AC] | 1-ethyl-3-methylimidazolium acetate | PVDF | Polyvinylidene fluoride |
| 22 | [EMIM][DCA] | 1-ethyl-3-methylimidazolium dicyanamide | PVDF | Polyvinylidene fluoride |
| 23 | [EMIM][Lac] | 1-ethyl-3-methylimidazolium lactate | PVDF | Polyvinylidene fluoride |
| 24 | [EMIM][NTf$_2$] | 1-ethyl-3-methylimidazolium bis(trifluoromethylsulfonyl)imide | PVDF | Polyvinylidene fluoride |
| 25 | [EMIM][SCN] | 1-ethyl-3-methylimidazolium thiocyanate | PVDF | Polyvinylidene fluoride |
| 26 | [HMIM][NTf$_2$] | 1-hexyl-3-methylimidazolium bis(trifluoromethylsulfonyl)imide | PES | Polyethersulfone |
| 27 | [OMIM][NTf$_2$] | 1-octyl-3-methylimidazolium bis(trifluoromethylsulfonyl)imide | PES | Polyethersulfone |
| 28 | [MIM][AC] | 1-methylimidazolium acetate | PVDF | Polyvinylidene fluoride |
| 29 | [BIM][AC] | 1-butyl imidazolium acetate | PVDF | Polyvinylidene fluoride |
| 30 | [N$_{2224}$][acetate] | Triethyl butyl ammonium acetate | PES | Polyethersulfone |
| 31 | [N$_{2224}$][diglutarate] | Triethyl butyl ammonium diglutarate | PES | Polyethersulfone |
| 32 | [N$_{2224}$]$_2$[dimaleate] | Ditriethyl butyl ammonium dimaleate | PES | Polyethersulfone |
| 33 | [N$_{2224}$][dimalonate] | Triethyl butyl ammonium dimalonate | PES | Polyethersulfone |
| 34 | [N$_{2224}$]$_2$[maleate] | Ditriethyl butyl ammonium dimaleate | PES | Polyethersulfone |
| 35 | [N$_{2224}$]$_2$[malonate] | Ditriethyl butyl ammonium dimaleate | PES | Polyethersulfone |
| 36 | [N$_{2224}$][NTf$_2$] | Triethyl butyl ammonium bis(trifluoromethylsulfonyl)imide | PES | Polyethersulfone |
| 37 | [N$_{2224}$][propionate] | Ditrityl butyl ammonium propionate | PES | Polyethersulfone |
| 38 | [EMIM][BF$_4$] | 1-ethyl-3-methylimidazolium tetrafluoroborate | PES | Polyethersulfone |
| 39 | [BMIM][BF$_4$] | 1-butyl-3-methylimidazolium tetrafluoroborate | PES | Polyethersulfone |
| 40 | [BMIM][PF$_6$] | 1-butyl-3-methylimidazolium hexafluorophosphate | PES | Polyethersulfone |

TABLE 2

| SILM | Ionic liquid | | Porous film | |
|---|---|---|---|---|
| 41 | [BMIM][Tf$_2$N] | 1-butyl-3-methylimidazolium bis(trifluoromethylsulfonyl)imide | PES | Polyethersulfone |
| 42 | [N$_{2224}$][acetate] | Trityl butyl ammonium acetate | PES | Polyethersulfone |
| 43 | [N$_{2224}$][dimalonate] | Ditrityl butyl ammonium dimalonate | PES | Polyethersulfone |
| 44 | [N$_{2224}$]$_2$[dimalcate] | Ditrityl butyl ammonium dimalcate | PES | Polyethersulfone |
| 45 | [N$_{2224}$]$_2$[maleate] | Ditrityl butyl ammonium maleate | PES | Polyethersulfone |
| 46 | [N$_{2224}$]$_2$[malonate] | Ditrityl butyl ammonium malonate | PES | Polyethersulfone |
| 47 | [N$_{2224}$][NTf$_2$] | Ditrityl butyl ammonium bis(trifluoromethylsulfonyl)imide | PES | Polyethersulfone |
| 48 | [N$_{2224}$][propionate] | Ditrityl butyl ammonium propionate | PES | Polyethersulfone |
| 49 | [BMIM][BF$_4$] | 1-butyl-3-methylimidazolium tetrafluoroborate | PVDF | Polyvinylidene fluoride |
| 50 | [APMIM][NTf$_2$] | 1-(3-aminopropyl)-3-methylimidazolium | Tubular Al$_2$O$_3$ | Cylindrical aluminum oxide |
| 51 | [EMIM][Ac] | 1-ethyl-3-methylimidazolium acetate | Porous Al$_2$O$_3$/TiO$_2$ tubes | Porous aluminum oxide/ titanium oxide tube |
| 52 | [EMIM][Ac] | 1-ethyl-3-methylimidazolium acetate | PVDF | Polyvinylidene fluoride |
| 53 | [EMIM][B(CN)$_4$] | 1-ethyl-3-methylimidazolium tetracyanoborate | PTEE | Polytetrafluoroethylene |
| 54 | [EMIM][BF$_4$] | 1-ethyl-3-methylimidazolium tetrafluoroborate | PVDF | Polyvinylidene fluoride |
| 55 | [EMIM][C(CN)$_3$] | 1-ethyl-3-methylimidazolium tricyanomethane | PTEE | Polytetrafluoroethylene |
| 56 | [EMIM][DCA] | 1-ethyl-3-methylimidazolium dicyanamide | PTEE | Polytetrafluoroethylene |
| 57 | [EMIM][ESO$_4$] | 1-ethyl-3-methylimidazolium ethylsulfone | PTEE | Polytetrafluoroethylene |
| 58 | [EMIM][Gly] | 1-ethyl-3-methylimidazolium glycine | PTEE | Polytetrafluoroethylene |
| 59 | [EMIM][MSO$_4$] | 1-ethyl-3-methylimidazolium methylsulfone | PTEE | Polytetrafluoroethylene |
| 60 | [EMIM][NTf$_2$] | 1-ethyl-3-methylimidazolium bis(trifluoromethylsulfonyl)imide | PES | Polyethersulfone |
| 61 | [EMIM][NTf$_2$] | 1-ethyl-3-methylimidazolium bis(trifluoromethylsulfonyl)imide | Al$_2$O$_3$ | Aluminum oxide |
| 62 | [EMIM][NTf$_2$] | 1-ethyl-3-methylimidazolium bis(trifluoromethylsulfonyl)imide | PTEE | Polytetrafluoroethylene |

TABLE 2-continued

| SILM | | Ionic liquid | Porous film | |
|---|---|---|---|---|
| 63 | [EMIM][SCN] | 1-ethyl-3-methylimidazolium thiocyanate | PTEE | Polytetrafluoroethylene |
| 64 | [EMIM][TCM] | 1-ethyl-3-methylimidazolium tricyanomethanide | Silica Nanoporous Ceramic | Silica nanoporous ceramic |
| 65 | [EMIM][TFA] | 1-ethyl-3-methylimidazolium trifluoroacetate | $Al_2O_3$ | Aluminum oxide film |
| 66 | [$C_3$MIM][$NTf_2$] | 1-propyl-3-methylimidazolium bis(trifluoromethylsulfonyl)imide | PTEE | Polytetrafluoroethylene |
| 67 | [BMIM][Ac] | 1-butyl-3-methylimidazolium acetate | PVDF | Polyvinylidene fluoride |
| 68 | [BMIM][Ac] | 1-butyl-3-methylimidazolium acetate | $Al_2O_3$ | Aluminum oxide film |
| 69 | [BMIM][BETI] | 1-butyl-3-methylimidazolium bis(perfluoroethyl(sulfonyl))imide | PES | Polyethersulfone |
| 70 | [BMIM][$BF_4$] | 1-butyl-3-methylimidazolium tetrafluoroborate | PVDF | Polyvinylidene fluoride |
| 71 | [BMIM][$BF_4$] | 1-butyl-3-methylimidazolium tetrafluoroborate | PES | Polyethersulfone |
| 72 | [BMIM][DCA] | 1-butyl-3-methylimidazolium dicyanamide | PVDF | Polyvinylidene fluoride |
| 73 | [BMIM][$NTf_2$] | 1-butyl-3-methylimidazolium bis(trifluoromethylsulfonyl)imide | PTEE | Polytetrafluoroethylene |
| 74 | [BMIM][$NTf_2$] | 1-butyl-3-methylimidazolium bis(trifluoromethylsulfonyl)imide | PVDF | Polyvinylidene fluoride |
| 75 | [BMIM][$NTf_2$] | 1-butyl-3-methylimidazolium bis(trifluoromethylsulfonyl)imide | $Al_2O_3$ | Aluminum oxide film |
| 76 | [BMIM][OTf] | 1-butyl-3-methylimidazolium trifluoromethanesulfonate | PVDF | Polyvinylidene fluoride |
| 77 | [BMIM][$PF_6$] | 1-butyl-3-methylimidazolium hexafluorophosphate | PTEE | Polytetrafluoroethylene |
| 78 | [BMIM][$PF_6$] | 1-butyl-3-methylimidazolium hexafluorophosphate | PVDF | Polyvinylidene fluoride |
| 79 | [BMIM][TCM] | 1-butyl-3-methylimidazolium tricyanomethanide | Silica nanoporous ceramic membrane | Silica nanoporous ceramic film |
| 80 | [HMIM][$NTf_2$] | 1-hexyl-3-methylimidazolium bis(trifluoromethylsulfonyl)imide | $Al_2O_3$ | Aluminum oxide film |

TABLE 3

| SILM | | Ionic liquid | Porous film | |
|---|---|---|---|---|
| 81 | [OMIM][$PF_6$] | 1-octyl-3-methylimidazolium hexafluorophosphate | PVDF | Polyvinylidene fluoride |
| 82 | [$C_8F_{13}$MIM][$NTf_2$] | 1-methyl-3-(3,3,4,4,5,5,6,6,7,7,8,8,-tridecafluoro octyl)imidazolium | $Al_2O_3$ | Aluminum oxide film |
| 83 | [$C_{10}$MIM][$BF_4$] | 1-decyl-3-methylimidazolium tetrafluoroborate | PVDF | Polyvinylidene fluoride |
| 84 | [$P_{4444}$][Gly] | Tetrabutylphosphonium glycine | PTEE | Polytetrafluoroethylene |
| 85 | [Vbtma][Ac] | Vinylbenzyl trimethylammonium acetate | PVDF | Polyvinylidene fluoride |
| 86 | [EMIM][B(CN)$_4$] | 1-ethyl-3-methylimidazolium tetracyanoborate | PTEE | Polytetrafluoroethylene |
| 87 | [EMIM][$BF_4$] | 1-ethyl-3-methylimidazolium tetrafluoroborate | PES | Polyethersulfone |
| 88 | [EMIM][C(CN)$_3$] | 1-ethyl-3-methylimidazolium tricyanomethane | PTEE | Polytetrafluoroethylene |
| 89 | [EMIM][$CF_3SO_3$] | 1-ethyl-3-methylimidazolium trifluoromethanesulfone | PES | Polyethersulfone |
| 90 | [EMIM][$CF_3SO_3$] | 1-ethyl-3-methylimidazolium trifluoromethanesulfone | PVDF | Polyvinylidene fluoride |
| 91 | [EMIM][DCA] | 1-ethyl-3-methylimidazolium dicyanamide | PES | Polyethersulfone |
| 92 | [EMIM][DCA] | 1-ethyl-3-methylirmdazolium dicyanamide | PTEE | Polytetrafluoroethylene |
| 93 | [EMIM][$ESO_4$] | 1-ethyl-3-methylimidazolium ethyl sulfate | PTEE | Polytetrafluoroethylene |
| 94 | [EMIM][$MSO_4$] | 1-ethyl-3-methylimidazolium methyl sulfate | PTEE | Polytetrafluoroethylene |
| 95 | [EMIM][$NTf_2$] | 1-ethyl-3-methylimidazolium bis(trifluoromethylsulfonyl)imide | PES | Polyethersulfone |
| 96 | [EMIM][$NTf_2$] | 1-ethyl-3-methylimidazolium bis(trifluoromethylsulfonyl)imide | PVDF | Polyvinylidene fluoride |
| 97 | [EMIM][$NTf_2$] | 1-ethyl-3-methylimidazolium bis(trifluoromethylsulfonyl)imide | PA | Polyamide |
| 98 | [EMIM][$NTf_2$] | 1-ethyl-3-methylimidazolium bis(trifluoromethylsulfonyl)imide | PP | Polypropylene |
| 99 | [EMIM][$NTf_2$] | 1-ethyl-3-methylimidazolium bis(trifluoromethylsulfonyl)imide | PVDF | Polyvinylidene fluoride |
| 100 | [EMIM][$NTf_2$] | 1-ethyl-3-methylimidazolium bis(trifluoromethylsulfonyl)imide | PA | Polyamide |
| 101 | [EMIM][$NTf_2$] | 1-ethyl-3-methylimidazolium bis(trifluoromethylsulfonyl)imide | PP | Polypropylene |
| 102 | [EMTM][$NTf_2$] | 1-ethyl-3-methylimidazolium bis(trifluoromethylsulfonyl)imide | PVDF | Polyvinylidene fluoride |
| 103 | [EMIM][SCN] | 1-ethyl-3-methylimidazolium thiocyanate | PTEE | Polytetrafluoroethylene |
| 104 | [$C_3NH_2$MIM][$NTf_2$] | N-aminopropyl 1-3-methylimidazolium bis(trifluoromethylsulfonyl)imide | PTEE | Polytetrafluoroethylene |
| 105 | [$C_3NH_2$MIM][$CF_3SO_3$] | N-aminopropyl 1-3-methylimidazolium bis(trifluoromethanesulfone)imide | PTEE | Polytetrafluoroethylene |
| 106 | [BMIM][$BF_4$] | 1-butyl-3-methylimidazolium tetrafluoroborate | PVDF | Polyvinylidene fluoride |
| 107 | [BMIM][$NTf_2$] | 1-ethyl-3-methylimidazolium bis(trifluoromethylsulfonyl)imide | PTEE | Polytetrafluoroethylene |
| 108 | [BMIM][$NTf_2$] | 1-ethyl-3-methylimidazolium bis(trifluoromethylsulfonyl)imide | PVDF | Polyvinylidene fluoride |
| 109 | [BMIM][$NTf_2$] | 1-ethyl-3-methylimidazolium bis(trifluoromethylsulfonyl)imide | PES | Polyethersulfone |
| 110 | [BMIM][$NTf_2$] | 1-ethyl-3-methylimidazolium bis(trifluoromethylsulfonyl)imide | PVDF | Polyvinylidene fluoride |

It is known to use an ionic liquid in order to separate carbon dioxide in carbon capture and storage (CCS) or the like. For example, coating a catalyst of an electrochemical reaction device with a polymerized ionic liquid improves an amount of carbon dioxide absorbed by the catalyst, to thereby be able to improve reduction performance of carbon dioxide by hydrogen generation suppression. However, in this method, attention is focused on the absorption amount of carbon dioxide, and increasing purity of carbon dioxide is not particularly considered. In contrast, the electrochemical reaction device of the embodiment can increase purity of carbon dioxide.

Figure 5:
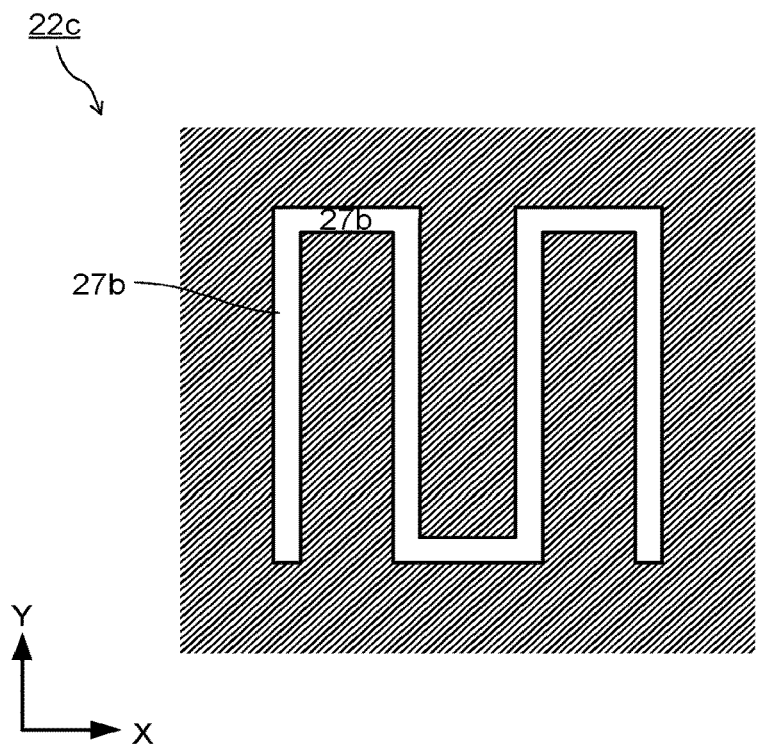
FIG. 5 is a diagram illustrating a part of an X-Y cross section of a flow path layer 22c.

FIG. 5 is a diagram illustrating a part of an X-Y cross section of the flow path layer 22c. The flow path layer 22c has an opening constituting a space 27b of the flow path 27. At least a part (at least a part of the space 27a) of the flow path 27 may extend along a surface facing the porous member 24 in a serpentine shape, a comb shape, a spiral shape, or a stripe shape. This can increase the proportion of the area of the part facing the flow path 27 and the porous member 24, per unit area. Note that the shape of the opening is not particularly limited as long as flow of the liquid/gas is not made a turbulent flow by that shape.

It is preferable that the space 27a is positioned above the space 27b and that the overlapping area of the space 27a and the porous film 28a is larger than the overlapping area of the space 27b and the porous film 28a. This can decrease variation in pressure distribution of a gas to the porous film 28a and the space 27b.

Figure 6:
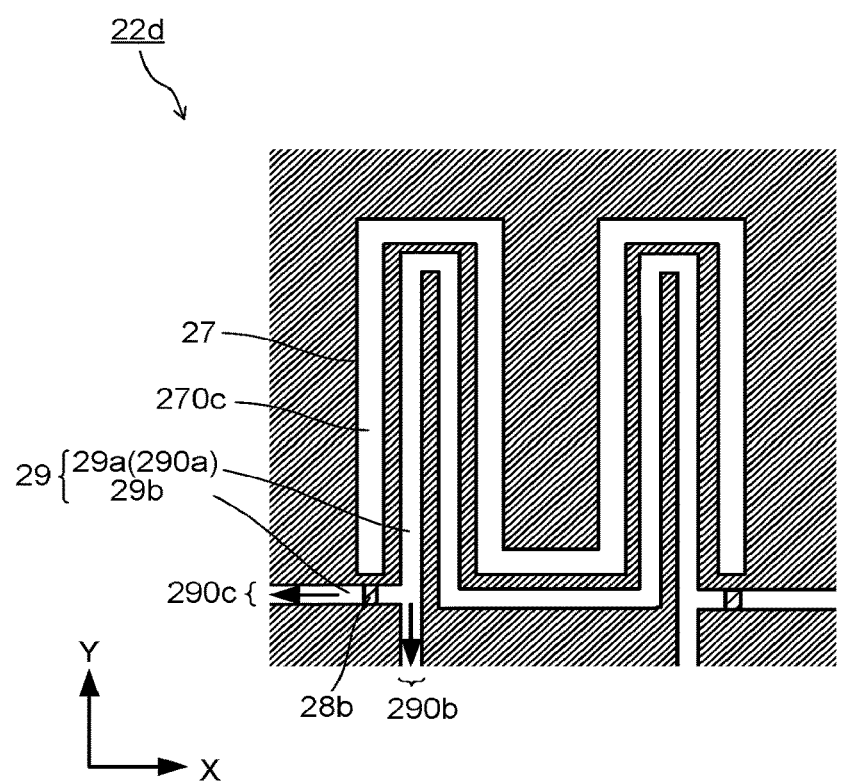
FIG. 6 is a diagram illustrating a part of an X-Y cross section of a flow path layer 22d.

FIG. 6 is a diagram illustrating a part of an X-Y cross section of the flow path layer 22d. The flow path layer 22d has an opening constituting an outlet 270c communicating with the space 27b, a flow path 29 having an inlet 290a, an outlet 290b and an outlet 290c, and a porous film 28b provided inside the flow path 29. The flow path 29 is not connected to the flow path 27. The outlet 270c faces the porous layer 24a, for example. Note that the porous film 28b is not necessarily required to be provided.

The porous film 28b divides a space 29a from a space 29b inside the flow path 29. As the porous film 28b, a SILM can be used similarly to in the case of the porous film 28a. Thereby, it is possible to materialize a function as a concentration film to concentrate and discharge a residual gas of unreduced carbon dioxide, for example. Thus, carbon dioxide can be efficiently collected and reused.

Materials of an ionic liquid and a porous film constituting the porous film 28b may be materials similar to those applicable to the porous film 28a, and are properly selected from combination listed in Table 1 to Table 3, for example, in accordance with usage. For example, when carbon dioxide is to be separated from carbon monoxide, it is preferable to use a nanofilter porous film containing γ-alumina and 1-methyl-3-(1-trimethoxysilyl methyl)imidazolium hexafluorophosphate [SMMIM][PF$_6$]) ionic liquid.

At least a part of the flow path 29 (at least a part of the space 29a) may extend along a surface facing the porous member 24 in a serpentine shape, a comb shape, a spiral shape, or a stripe shape. This can increase the proportion of the area of the part facing the flow path 29 and the porous member 24, per unit area.

The flow path plate 22 is formed, for example, by laminating the flow path layer 22a to the flow path layer 22d and fixing them by a screw or the like in a manner to penetrate the whole thereof. Further, a flow path pattern, the inlet and the outlet, the opening and the groove of each flow path layer are formed by cutting a part of the flow path layer. Note that they may be formed by opening a hole from a horizontal direction of the flow path layer by a drill or the like, without penetration of the flow path layer. The porous film 28b may be disposed in a slot, which may be provided in the middle of the opening constituting the outlet. Further, it is possible to make the opening of the flow path layer 22b larger than the opening of the flow path layer 22a and to sandwich the porous film 28a between the flow path layer 22a and the flow path layer 22c, fixing them mechanically. Further, the porous film 28a may be fixed by an adhesive. On this occasion, in order to secure air tightness so as not to let a gas flow between the flow path layer 22b and the porous film 28a, it is possible to use an O ring or the like to perform sealing. A groove for disposing the O ring may be provided in the flow path plate 22. Sealing may be performed by using a sealing method which is ordinarily used in a fuel cell, for example.

Next, an operation of the electrochemical reaction device of the embodiment will be described. Here, the case where carbon monoxide (CO) is generated as a carbon compound is mainly described, but the carbon compound as a reduction product of carbon dioxide is not limited to carbon monoxide. The carbon compound may be, as described above, methane ($CH_4$), ethane ($C_2H_6$), ethylene ($C_2H_4$), methanol ($CH_3OH$), ethanol ($C_2H_5OH$), ethylene glycol ($C_2H_6O_2$), or the like, and carbon monoxide being the reduction product may be further reduced to generate the aforementioned organic compound. Further, as a reaction process by the electrochemical reaction device, the case of generating mainly hydrogen ions ($H^+$) and the case of generating mainly hydroxide ions ($OH^-$) are considered, but the reaction process is not limited to either one of these reaction processes.

First, a reaction process of the case where mainly water ($H_2O$) is oxidized to generate hydrogen ions ($H^+$) will be described. When a current is supplied to the anode unit 10 and the cathode unit 20 from the power supply 40, oxidation reaction of water ($H_2O$) occurs in the anode unit 10. More specifically, as expressed by the formula (1) below, $H_2O$ contained in an electrolytic solution is oxidized to generate oxygen ($O_2$) and hydrogen ions ($H^+$).

$$2H_2O \rightarrow 4H^+ + O_2 + 4e^- \qquad (1)$$

$H^+$ generated in the anode unit 10 moves in the electrolytic solution existing in the anode unit 10 and the separator 30, and reaches the cathode unit 20.

Figure 7:
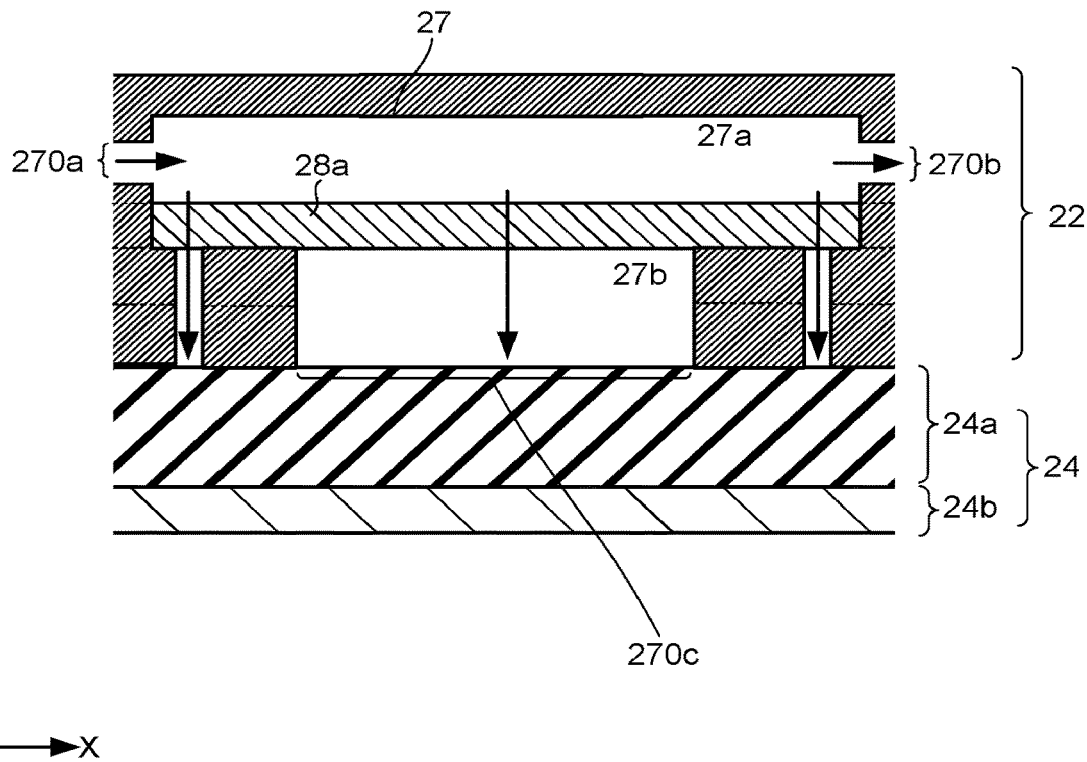
FIG. 7 is a diagram illustrating a part of an X-Z cross section of a flow path plate 22.
Figure 8:
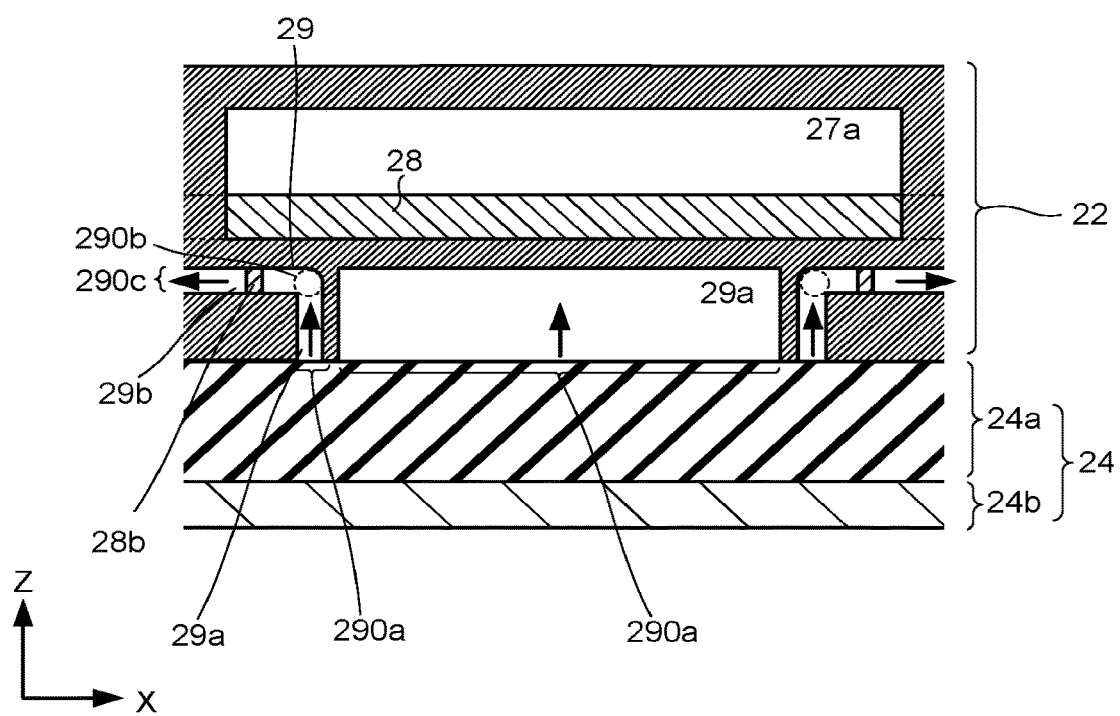
FIG. 8 is a diagram illustrating a part of the X-Z cross section of the flow pass plate 22.

FIG. 7 and FIG. 8 are schematic diagrams for explaining flow of a gas in the flow path plate 22. FIG. 7 illustrates a part of an X-Z cross section of the flow path plate 22 including the inlet 270a and the outlet 270b. FIG. 8 illustrates a part of the X-Z cross section of the flow path plate 22 including the outlet 290c.

First, a gas such as an exhaust gas containing carbon dioxide is supplied from the inlet 270a to the space 27a inside the flow path 27. The above-described introduction may be controlled by a flow rate controller or the like, for example. Carbon dioxide in the supplied gas is separated by the porous film 28a as illustrated in FIG. 7, and moves to the space 27b. Further, the gas containing a gas other than carbon dioxide is discharged from the outlet 270b. Thereby, decrease in separation performance of the porous film 28a due to passage of time can be suppressed. Separated carbon dioxide is discharged from the outlet 270c and moves to the porous member 24. The above-described discharge may be controlled by a pump or the like, for example.

Carbon dioxide having moved to the porous member 24 is reduced by the reduction catalyst in the reduction catalyst layer 24b via the porous layer 24a. Reduction reaction of carbon dioxide ($CO_2$) occurs by an electron ($e^-$) based on the current supplied from the power supply 40 to the cathode unit 20 and $H^+$ having moved to the cathode unit 20. More specifically, as expressed by the formula (2) below, $CO_2$ supplied to the cathode unit 20 is reduced to generate CO.

$$2CO_2 + 4H^+ + 4e^- \rightarrow 2CO + 2H_2O \qquad (2)$$

Next, a reaction process of the case where mainly carbon dioxide ($CO_2$) is reduced to generate hydroxide ions ($OH^-$) will be described. When a current is supplied to the anode unit 10 and the cathode unit 20 from the power supply 40, as expressed by the formula (3) below, water ($H_2O$) and carbon dioxide ($CO_2$) are reduced to generate carbon monoxide (CO) and hydroxide ions ($OH^-$) in the cathode unit 20. The hydroxide ions ($OH^-$) are diffused in the anode unit 10 and as expressed by the formula (4) below, the hydroxide ions ($OH^-$) are oxidized to generate oxygen ($O_2$).

$$2CO_2 + 2H_2O + 4e^- \rightarrow 2CO + 4OH^- \qquad (3)$$

$$4OH^- \rightarrow 2H_2O + O_2 + 4e^- \qquad (4)$$

In each of the aforementioned reaction process in which mainly the hydrogen ions ($H^+$) are generated and reaction process in which mainly the hydroxide ions ($OH^-$) are generated, oxygen ($O_2$) is generated in the anode unit 10.

A mixed gas which contains a carbon compound being a reduction product such as carbon monoxide and unreduced carbon dioxide moves from the porous member 24 to the space 29a of the flow path 29 via the inlet 290a as illustrated in FIG. 8. Carbon dioxide contained in the supplied gas is separated by the porous film 28b and moves to the space 29b. The separated carbon dioxide is discharged from the outlet 290c. Further, the gas containing the carbon compound is discharged from the outlet 290b. Thereby, carbon dioxide is concentrated. Further, carbon monoxide separated from carbon dioxide is also concentrated.

The separation performance of carbon dioxide by the porous film 28a and the porous film 28b can be found logically by calculation, for example. In this case, what is called a cross-flow configuration is supposed. The cross-flow configuration is a configuration which has a SILM dividing one inlet of gas from a plurality of outlets of gas. By adopting the cross-flow configuration and providing the plurality of gas outlets, a mole fraction after gas separation can be changed across the SILM in relation to a mole fraction of composition gases of a mixed gas, and in this case, a mole fraction of a gas of carbon dioxide in the gas after passing through the SILM can be made higher than a mole fraction of the gas of the carbon dioxide in the gas before passing through the SILM. For example, in the case where a mixed gas composed of 0.5 mole fraction of a gas of carbon dioxide and 0.5 mole fraction of a gas of $N_2$ is introduced and separated by a SILM of cross-flow configuration, a mole fraction of the gas of carbon dioxide after SILM separation is 0.7, with a pressure ratio across the SILM being 0.5 and target mole fractions of respective configuration gases to be discarded being 0.4 and 0.6. In this case, an area of the SILM film is 4351 cm$^2$ (about 66 cm☐), but balance between the area and the mole fraction of the gas of carbon dioxide after SILM film separation can be adjusted in correspondence with the configuration and usage. For example, in the case of an electrochemical reaction device whose conversion efficiency from a $CO_2$ gas to a CO gas is small, an electrochemical reaction device with a large area (which concomitantly includes a SILM with a large area) may be used to select a configuration where a mole fraction of the gas of carbon dioxide after separation becomes high. Alternatively, in the case of an electrochemical reaction device with a comparatively high conversion efficiency from a $CO_2$ gas to a CO gas, an electrochemical reaction device with a smaller area (which concomitantly includes a SILM with a smaller area) may be used to select a configuration where a mole fraction of the gas of carbon dioxide after separation becomes low but a gas of discarded carbon dioxide is circulated outside a cell.

Figure 9:
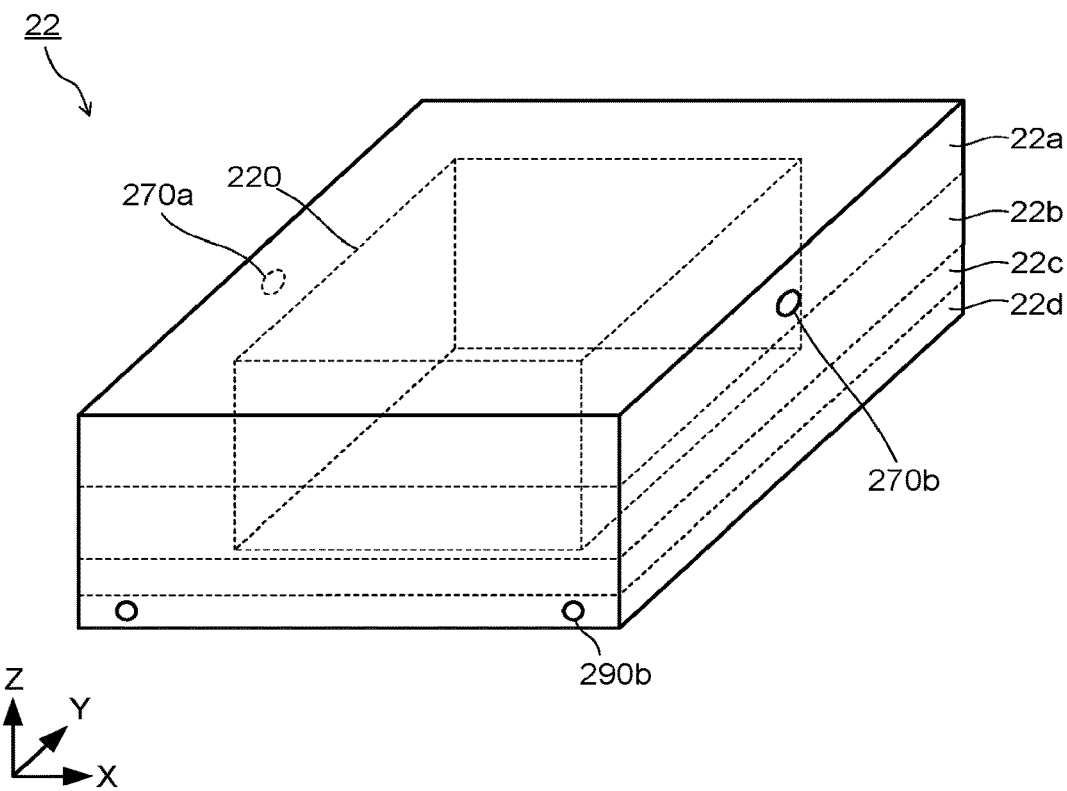
FIG. 9 is an external appearance schematic diagram illustrating another structure example of the flow path plate 22.
Figure 10:
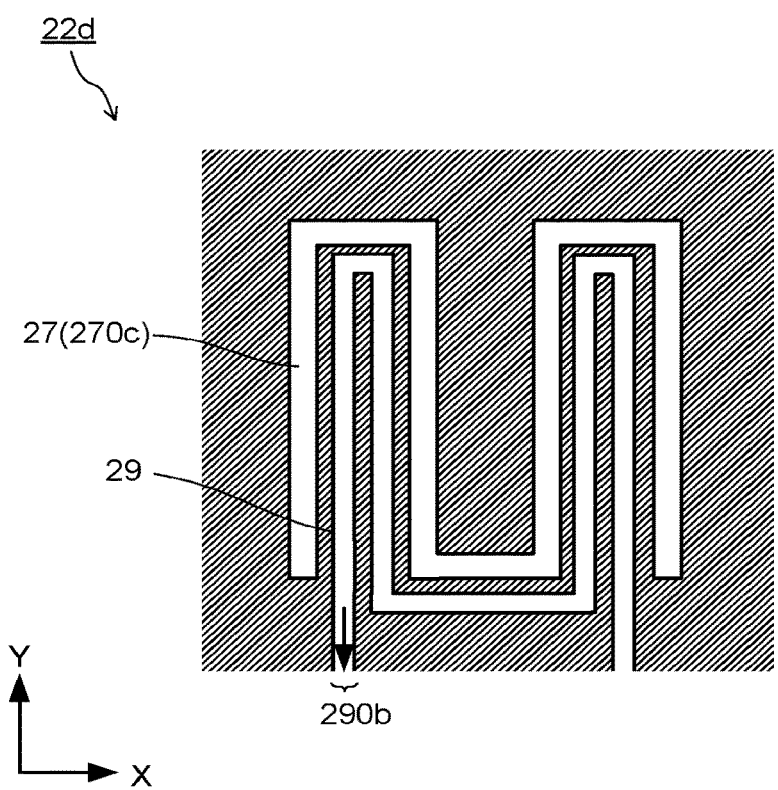
FIG. 10 is a diagram illustrating an X-Y cross section of another example of the flow path layer 22d.
Figure 11:
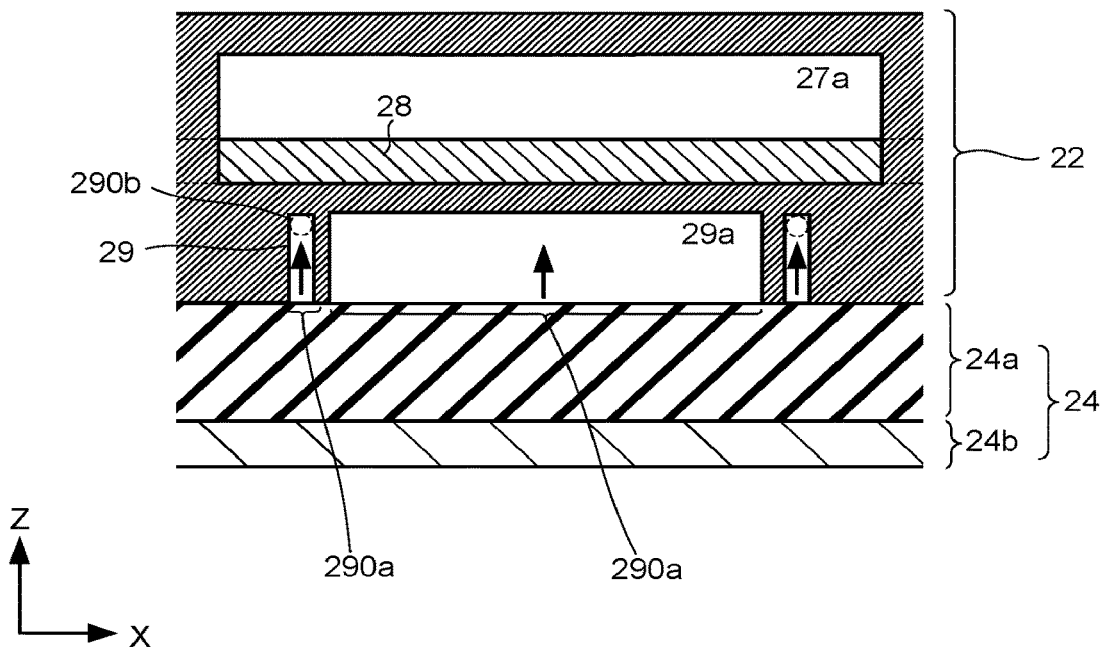
FIG. 11 is a diagram illustrating an X-Z cross section of another example of the flow path plate 22.

A structure example of the flow path plate 22 is not limited to the structures described with reference to FIG. 2 to FIG. 8. FIG. 9 to FIG. 11 are schematic diagrams illustrating parts of other structure examples of the flow path plate 22. FIG. 9 is the external appearance schematic diagram illustrating another structure example of the flow path plate 22, FIG. 10 is the diagram illustrating an X-Y cross section of another example of the flow path layer 22d, and FIG. 11 is the diagram illustrating an X-Z cross section including a flow path 29 of another example of the flow path plate 22. At least a part of each of structures of the flow path plate 22 illustrated in FIG. 2 to FIG. 8 may be properly combined. Further, as explanation for other structure examples of the flow path plate 22 illustrated in FIG. 9 to FIG. 11, explanation for the structures illustrated in FIG. 2 to FIG. 8 can be properly cited.

The flow path plates illustrated in FIG. 9 to FIG. 11 have configurations in which porous films 28b are not provided. In this case, outlets 290c are not required to be provided. When a mixed gas containing unreduced carbon dioxide and a carbon compound is introduced from the inlet 290a, the gas is discharged as it is from an outlet 290b without separation of carbon dioxide.

Figure 12:
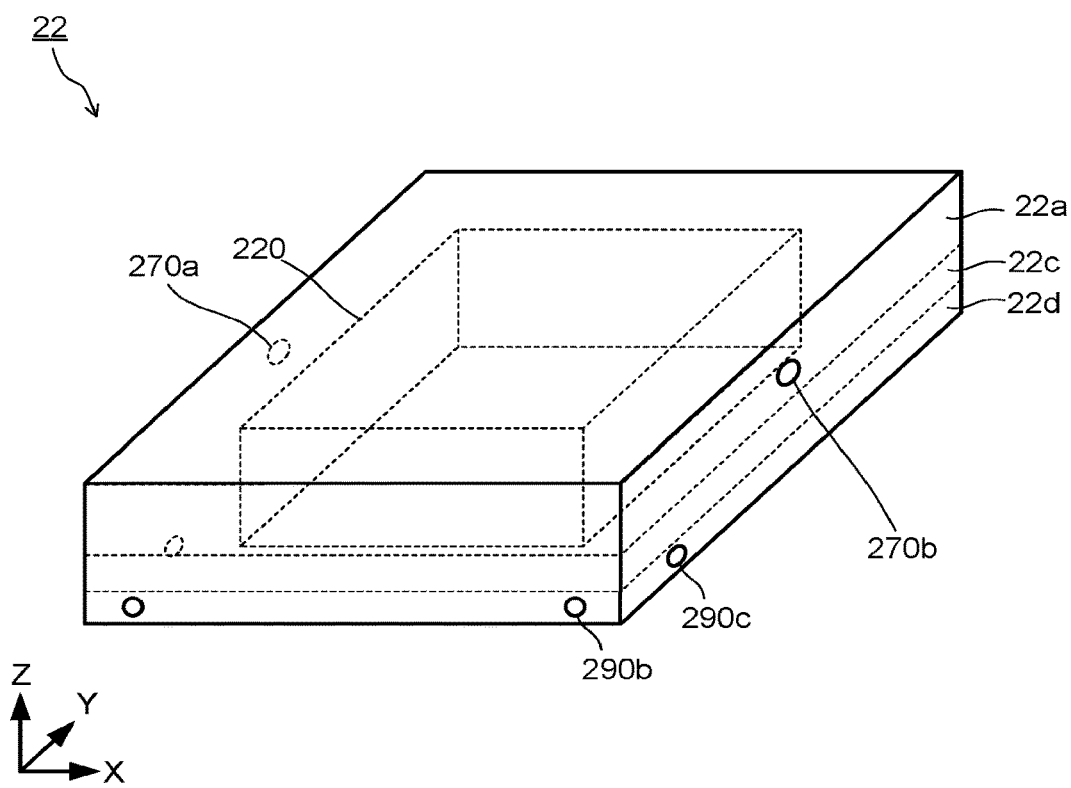
FIG. 12 is an external appearance schematic diagram illustrating another structural example of the flow path plate 22.
Figure 13:
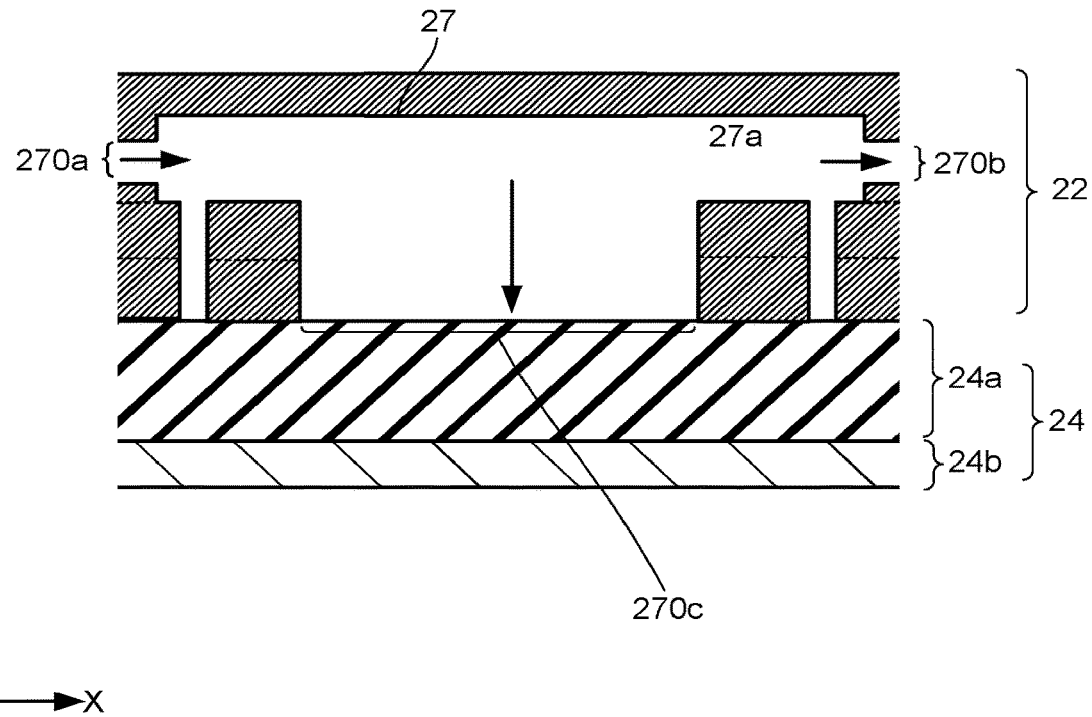
FIG. 13 is a diagram illustrating an X-Z cross section of another example of the flow path plate 22.
Figure 14:
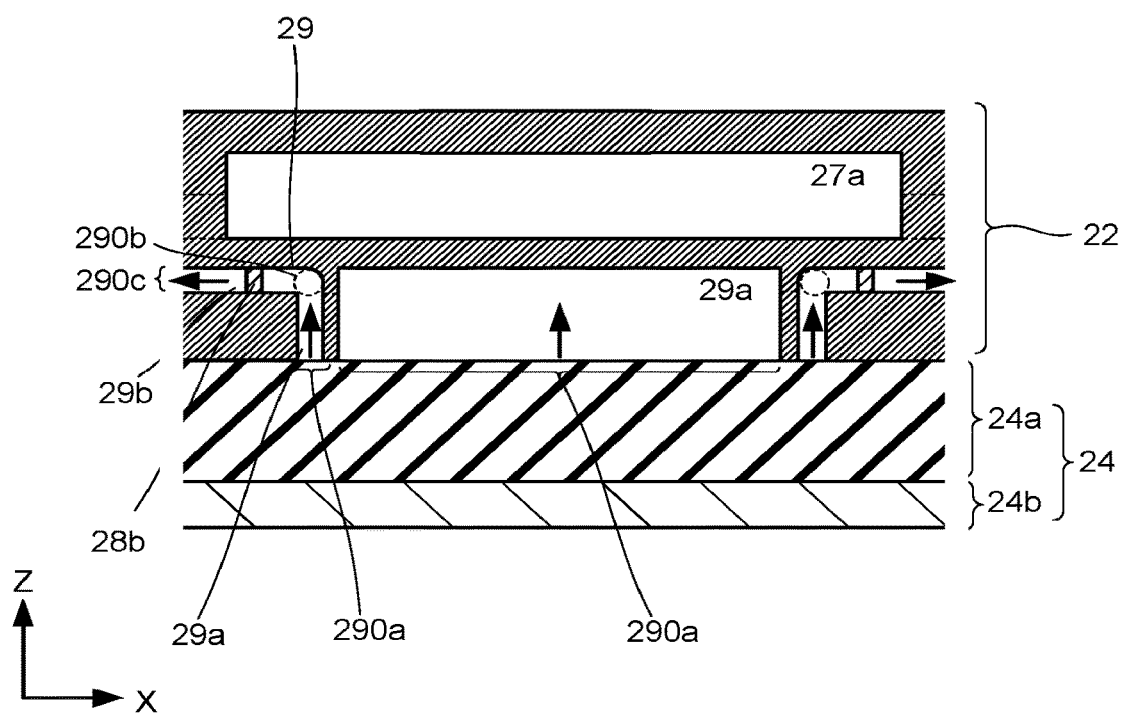
FIG. 14 is a diagram illustrating an X-Z cross section of another example of the flow path plate 22.

FIG. 12 to FIG. 14 are schematic diagrams illustrating parts of other structure examples of the flow path plate 22. FIG. 12 is the external appearance schematic diagram illustrating another structure example of the flow path plate 22, FIG. 13 is the diagram illustrating an X-Z cross section including an inlet 270a and an outlet 270b of another example of the flow path layer 22d, and FIG. 14 is the diagram illustrating an X-Z cross section including an outlet 290c of another example of the flow path plate 22. At least a part of each of structures of the flow path plate 22 illustrated in FIG. 2 to FIG. 8 may be properly combined. Further, as explanation for other structure examples of the flow path plate 22 illustrated in FIG. 12 to FIG. 14, explanation for the structures illustrated in FIG. 2 to FIG. 9 can be properly cited.

The flow path plates illustrated in FIG. 12 to FIG. 14 have configurations in which porous films 28a are not provided. In this case, flow path layers 22b are not required to be provided. When a mixed gas containing carbon dioxide and a gas such as oxygen and nitrogen is introduced from an inlet 270a, the gas is discharged as it is from an outlet 270b or an outlet 270c without separation of carbon dioxide.

EXAMPLE

Example 1

An electrochemical reaction device illustrated in FIG. 1 was fabricated. As a configuration of a flow path plate 22, structures illustrated in FIG. 2 to FIG. 8 were adopted. As a porous film 28a, a PES porous film which was permeated with [HMIM][NTf$_2$] was used. As a porous film 28b, a γ-alumina porous film which was permeated with [SMMIM][PF$_6$] was used. When a mixed gas containing carbon dioxide, nitrogen, and oxygen was introduced to the flow path plate 22 of the electrochemical reaction device of the aforementioned structure, carbon dioxide was separated by the porous film 28a and nitrogen and oxygen not contributing to reaction were able to be discharged to the outside. Further, a mixed gas containing unreduced carbon dioxide and generated carbon monoxide was introduced from a porous member 24 to the flow path plate 22, carbon dioxide was separated by the porous film 28b, separated carbon dioxide was discharged, and a CO gas being a generation gas was concentrated as a result of higher partial pressure and was discharged. Further, by supplying the gas from an upper direction in relation to a flow path part under the porous film 28a, it was possible to make variation of pressure distribution of carbon dioxide inside the gas flow path small.

Example 2

An electrochemical reaction device illustrated in FIG. 1 was fabricated. As a configuration of a flow path plate 22, structures illustrated in FIG. 9 to FIG. 11 were adopted. As a porous film 28a, a PES porous film which was permeated with [HMIM][NTf$_2$] was used. When a mixed gas containing carbon dioxide, nitrogen, and oxygen was introduced to the flow path plate 22 of the electrochemical reaction device of the aforementioned structure, carbon dioxide was separated by the porous film 28a and nitrogen and oxygen not contributing to reaction were able to be discharged to the outside. Further, by supplying the gas from an upper direction in relation to a flow path part under the porous film 28a, it was possible to make variation of pressure distribution of carbon dioxide inside the gas flow path small.

Example 3

An electrochemical reaction device illustrated in FIG. 1 was fabricated. As a configuration of a flow path plate 22, structures illustrated in FIG. 12 to FIG. 14 were adopted. As a porous film 28b, a γ-alumina porous film which was permeated with [SMMIM][$PF_6$] was used. Further, a mixed gas containing unreduced carbon dioxide and generated carbon monoxide was introduced from a porous member 24 to the flow path plate 22, carbon dioxide was separated by the porous film 28b, separated carbon dioxide was discharged, and a CO gas being a generation gas was concentrated as a result of higher partial pressure and was discharged. Further, by supplying the gas from an upper direction in relation to a flow path part under a porous film 28a, it was possible to make variation of pressure distribution of carbon dioxide inside the gas flow path small.

The above-described embodiments have been presented by way of example only, and are not intended to limit the scope of the inventions. The above-described embodiments may be embodied in a variety of other forms, and various omissions, substitutions and changes in the form may be made without departing from the spirit of the invention. The above-described embodiments and their modifications are included in the scope and spirit of the invention and are included in the invention described in claims and their equivalents.

What is claimed is:

1. An electrochemical reaction device comprising:
    an anode unit to oxidize water and thus generate oxygen;
    a cathode unit to reduce carbon dioxide and thus generate a carbon compound and hydrogen;
    a separator separating the anode and cathode units; and
    a power supply connected to the anode and cathode units, the cathode unit including:
        a porous member having a first surface and a second surface;
        a flow path plate facing the first surface; and
        a reduction catalyst on the second surface, and
    the flow path plate including:
        a flow path through which a target gas containing the carbon dioxide flows; and
        a porous film separating a first space and a second space inside the flow path and being permeated with an ionic liquid, the ionic liquid being configured to separate the carbon dioxide from the target gas.

2. The device according to claim 1,
    wherein an air permeability of the carbon dioxide in the ionic liquid is higher than at least one air permeability selected from the group consisting of an air permeability of oxygen, an air permeability of nitrogen, an air permeability of hydrogen, an air permeability of helium, an air permeability of a sulfur compound, and an air permeability of the carbon compound in the ionic liquid.

3. The device according to claim 1,
    wherein the target gas further contains at least one gas selected from the group consisting of oxygen, nitrogen, hydrogen, helium, and a sulfur compound, and
    wherein the flow path includes:
        an inlet to introduce the target gas into the first space;
        an outlet to discharge the target gas from the first space; and
        a second outlet facing the first surface and configured to discharge the separated carbon dioxide from the second space to the porous member.

4. The device according to claim 3,
    wherein the ionic liquid contains 1-hexyl-3-methylimidazolium bis(trifluoromethylsulfonyl)imide or 1-octyl3-methylimidazolium bis(trifluoromethylsulfonyl)imide, and
    wherein the porous film contains polyethersulfone.

5. The device according to claim 1,
    wherein the target gas further contains the carbon compound, and
    wherein the flow path includes:
        an inlet to introduce the target gas from the porous member into the first space;
        an outlet to discharge the target gas from the first space; and
        a second outlet to discharge the separated carbon dioxide from the second space.

6. The device according to claim 5,
    wherein the ionic liquid contains 1-methyl-3-(1-trimethoxysilyl methyl)imidazolium hexafluorophosphate, and
    wherein the porous film contains γ-alumina.

7. The device according to claim 1,
    wherein the target gas further contains at least one gas selected from the group consisting of oxygen, nitrogen, hydrogen, helium, and a sulfur compound,
    wherein the flow path includes:
        an inlet to introduce the target gas into the first space;
        an outlet to discharge the target gas from the first space; and
        a second outlet facing the first surface and configured to discharge the separated carbon dioxide from the second space to the porous member,
    wherein the flow path plate further includes:
    a second flow path through which a second target gas containing the carbon dioxide and the carbon compound flows; and
    a second porous film separating a third space and a fourth space inside the second flow path and being permeated with a second ionic liquid to separate the carbon dioxide from the second target gas, and
    wherein the second flow path includes:
        a second inlet facing the first surface and configured to introduce the second target gas from the porous member to the third space;
        a third outlet to discharge the second target gas from the first space; and
        a fourth outlet to discharge the separated carbon dioxide from the fourth space.

8. The device according to claim 7,
    wherein the ionic liquid contains 1-hexyl-3-methylimidazolium bis(trifluoromethylsulfonyl)imide or 1-octyl-3-methylimidazolium bis(trifluoromethylsulfonyl)imide,
    wherein the porous film contains polyethersulfone,
    wherein the second ionic liquid contains 1-methyl-3-(1-trimethoxysilyl methyl)imidazolium hexafluorophosphate, and
    wherein the second porous film contains γ-alumina.

9. The device according to claim 1,
    wherein the carbon compound is carbon monoxide.

10. The device according to claim 1,
    wherein at least a part of the second space extends along the first surface in a serpentine shape, a comb shape, a spiral shape, or a stripe shape.

11. The device according to claim 10,
    wherein the first space is disposed above the second space, and wherein an area of an overlap between the first space and the porous film is larger than an area of an overlap between the second space and the porous film.

* * * * *